United States Patent [19]

Grawley et al.

[11] 3,948,707

[45] Apr. 6, 1976

[54] FLEXIBLE SEALED TRACK BELT

[75] Inventors: Charles E. Grawley, Peoria; Robert W. Untz, Hanna City; Marvin E. Beyers, Peoria, all of Ill.

[73] Assignee: Caterpillar Tractor Co., Peoria, Ill.

[22] Filed: Feb. 13, 1974

[21] Appl. No.: 442,153

Related U.S. Application Data

[62] Division of Ser. No. 282,707, Aug. 22, 1972, Pat. No. D231,700.

[52] U.S. Cl. .................. 156/137; 74/132; 156/172; 156/176; 156/179; 156/188; 156/190; 156/196; 156/209; 264/236; 264/296; 264/320; 264/326; 305/35 R; 305/39
[51] Int. Cl.² ......................................... B29D 17/00
[58] Field of Search ........... 156/137, 138, 140, 141, 156/172, 176, 178, 179, 187, 188, 190, 194, 196, 206, 209, 242; 264/236, 347, 296, 320, 315, 326; 305/35 R, 42, 43, 39, 38, 35 EB; 74/232, 237, 234

[56] References Cited
UNITED STATES PATENTS

| | | | |
|---|---|---|---|
| 3,061,873 | 11/1962 | Supitilon et al. | 264/315 |
| 3,063,758 | 11/1962 | Fikse | 305/43 |
| 3,357,750 | 12/1967 | Reynolds et al. | 305/42 |
| 3,628,834 | 12/1971 | Anderson | 305/35 R |
| 3,773,394 | 11/1973 | Grawey | 156/137 |

*Primary Examiner*—Edward G. Whitby
*Attorney, Agent, or Firm*—Phillips, Moore, Weissenberger, Lempio & Strabala

[57] ABSTRACT

Track belts designed to fit circumferentially around a pneumatic bladder or tire carcass can be sealed against the ingress of soil and rock between the track shoes attached about the outer periphery of the belt by forming individual and permanent flat sites on the outer circular periphery of the belt so the flat undersurface of each track shoe is nested on a flat shoe site and therefore does not have triangular shaped gaps under its leading and trailing edges. A transverse rib of elastomer, raised from the surface belt between each of the adjacent flat sites further seals the belt in the narrow gaps formed between adjacent track shoes thereby preventing the ingress of soil and rock in these gaps when the shoes pass through a footprint formed as the pneumatic supported system is rolled. In elevation the outer surface of this pneumatic carcass supported belt is polygonol in appearance with a ridge or rib located at each joint between adjacent flat surfaces of the shoe sites which are circumferentially disposed around the belt.

4 Claims, 5 Drawing Figures

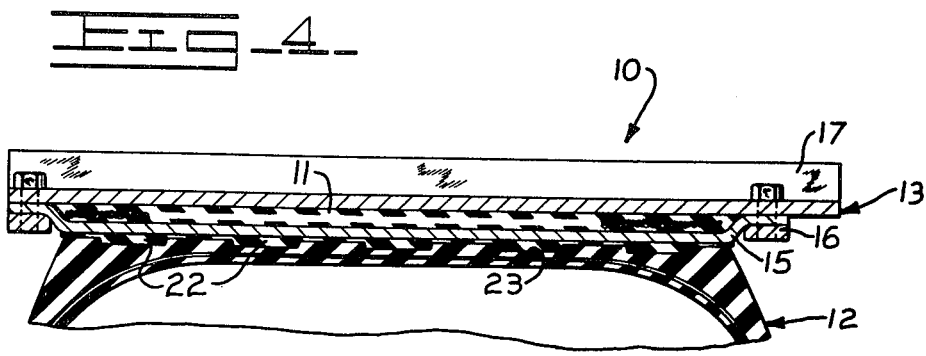
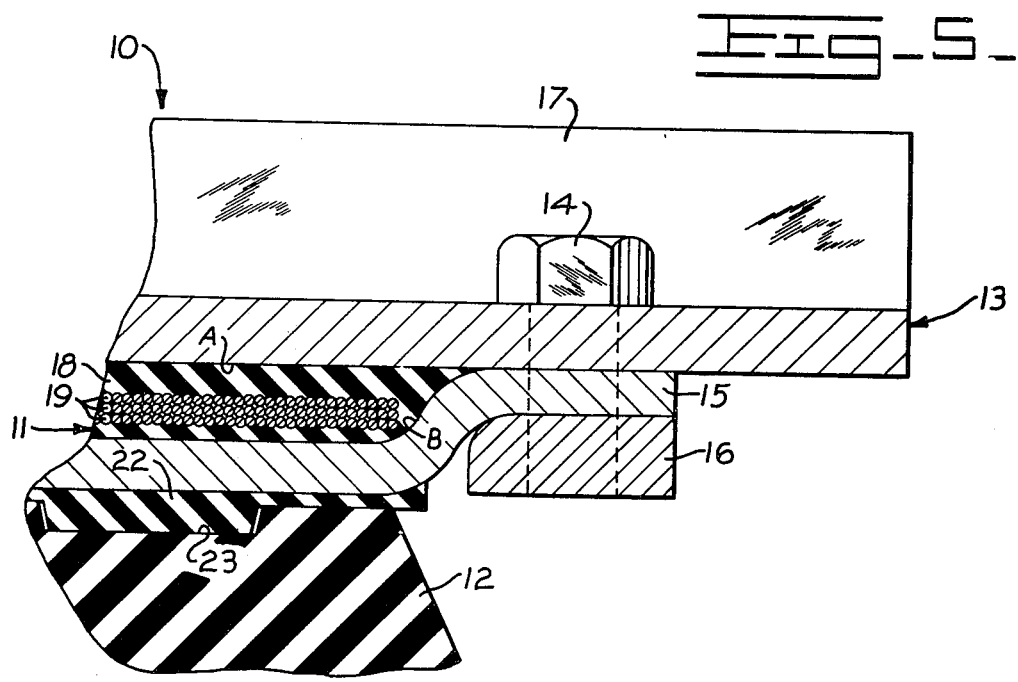

FLEXIBLE SEALED TRACK BELT

This is a division of Ser. No. 282,707, filed Aug. 22, 1972, now U.S. Pat. No. Des. 231,700.

BACKGROUND OF THE INVENTION

Flexible track belts having track shoes circumferentially mounted about their periphery are usually composed of a cylindrical elastomer belt, or belts, having a central core or ply of reinforcing within the belts. Track shoes are attached transversely to these internally wire or cable reinforced belts at equally spaced intervals about their outer periphery by placing a keeper bar or plate on the inner periphery of the belt or belts and bolting or fastening an associated track shoe, located on the outer periphery, to the keeper bar so the belt is between the keeper bar and shoe. For example, see U.S. Pat. No. 2,273,950 issued to Galanot et al.

When these belts are placed over a pneumatic supporting carcass the portions of the belt or belts between adjacent bars conform to the circular periphery of the carcass resulting in generally triangular shaped gaps under the leading and trailing edges of the attached shoes whose flat underside surfaces mount generally tangentially on the arcuate surface of the belt or belts, except to the extent the keeper bar distorts the belt under its shoe. A further example of a track belt is illustrated in this inventor's copending U.S. Patent application Ser. No. 93,033 filed Nov. 27, 1970 and entitled "Flexible Track Belts" now U.S. Pat. No. 3,773,394.

While these flexible track belts, when supported by a pneumatic carcass and preferably a radially reinforced carcass, provide increased traction, improved floation and resistance to puncture, the ingress of soil and rock under the leading and trailing edges of the track shoes and between the edges of adjacent shoes cause deterioration of the supporting elastomer belt in these areas.

Thus it is the principal object of this invention to provide a fully sealed track belt that prevents the ingress of soil and rock under and between its track shoes during articulation of the belt and its shoes and to thereby achieve improved service life and better overall performance.

SUMMARY OF THE INVENTION

The above object and many other advantages are obtained by a sealed flexible track belt for employment with pneumatic supporting carcasses which includes a cylindrical elastomer belt having an internal central reinforcing ply formed by a plurality of inextensible circular loops in a side-by-side relationship that has a plurality of flat shoe sites permanently formed in the elastomer forming its outer circular periphery with a plurality of track shoes, arranged so one shoe is mounted on each flat shoe site and retained thereon by an associated keeper bar located beneath the reinforcing ply, whereby each flat shoe has a mating flat surface on the belt surface that eliminates gaps under the leading an trailing edges of the shoe. The track belt is further sealed by raised transverse ribs or ridges of elastomer integrally formed in the outer elastomer surface of the belt between the flat shoe sites that prevents the ingress of dirt and rock into the small gap between adjacent track shoes when they have been attached to the belt or belts.

BRIEF DESCRIPTION OF THE DRAWINGS

FIG. 4 is a cross section of the track belt and pneumatic carcass illustrated in FIG. 1; and FIG. 5 is an enlarged partial section of one side of the cross section shown in FIG. 4.

DESCRIPTION OF THE PREFERRED EMBODIMENT

Figure 1:
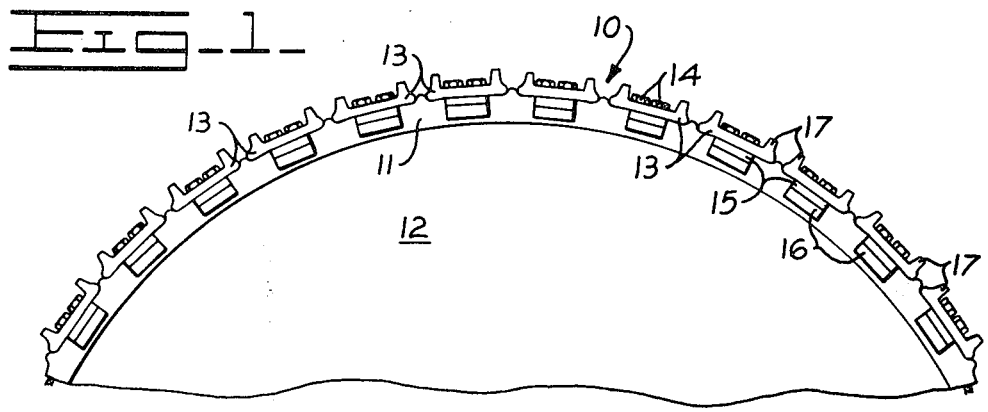
FIG. 1 is an elevation of the track belt supported on a pneumatic carcass, with the lower half of both the belt and carcass broken away.

In FIG. 1 an arcuate portion of a cylindrical track belt 10 is shown mounted on a pneumatic supporting carcass 12 which is preferably a radially reinforced carcass, such as shown in this assignee's U.S. Pat. No. 3,606,921, issued to Grawey. However the track belt can be mounted on other types of tire carcasses. As can be seen in FIG. 1, the sealed track belt includes a cylindrical elastomer belt 11 which is mounted about the circular periphery of a pneumatic tire carcass 12. A plurality of track shoes 13 are attached to the outer periphery of the belt with cap bolts 14 which pass through holes in their associated shoe and holes in the ends of an associated keeper plate or bar 15 into a retaining block 16 where threaded bores receive the threaded ends of the cap bolts. The elastomer belt is thus clamped between the keeper bar and the flat underside of its associated track shoe, as best illustrated in FIGS. 4 and 5. With reference to the track shoes, each is illustrated with spaced metal grousers 17, but it should be appreciated that these metal grousers could be replaced with rubber grousers or alternate metal configurations. Each track shoe 13 is attached in the manner described above as illustrated in FIGS. 4 and 5 so the cylindrical belt 11 is tightly clamped between the flat underside surface A of each track shoe and a channel-shaped recess B formed by bending the ends of the keeper bar 15 upwardly and then outwardly, as illustrated best in FIGS. 4 and 5.

The cylindrical elastomer belt 11 is composed of cured elastomer 18 which surrounds the cylindrical reinforcing plies 19 of the belt which are centrally located therein; three of these plies being shown in FIGS. 4 and 5, and positioned approximately at the neutral bending axis of the elastomer belt. Each cylindrical reinforcing ply is composed of side-by-side circular loops or convolutions of inextensible reinforcing, such as wire, cable, or other reinforcing materials such as glass fibers having less than 5% elongation under the tension to which the reinforcing loops in the elastomer belt are subjected when it is in use. These cylindrical reinforcing plies may be formed by winding a reinforcing filament about a constant diameter across the width of the cylindrical belt or with closed loops of equal diameters arranged in a side-by-side relationship to form the cylindrical ply.

Normally a circular drum is employed to form the elastomer belt by placing a layer of elastomer of uniform thickness on the drum and then winding the reinforcing filament across this layer to form each ply 19.

Subsequently another layer of elastomer is applied over the reinforcing and then the entire belt is cured as a unit. The outer surface is usually wrapped with shrink tape to increase the elastomer density during cure. If desired the keeper bars 15 can be integrally formed with the belt by employing the drum as a base (1) applying a thin layer of elastomer to its surface, (2) locating the keeper bars on this layer,(3) placing elastomer stock between the keeper bars followed by a layer of elastomer to form a circular foundation on which the cylindrical reinforcing plies can be wound and (4) winding the reinforcing plies on this foundation. Thereafter the belt can be completed as described above and subsequently cured, as uncured elastomer is employed in fabricating all the belts. While only a single elastomer belt 11 is shown it must be appreciated multiple belts could be employed with the instant concept in place of the single belt.

Figure 2:
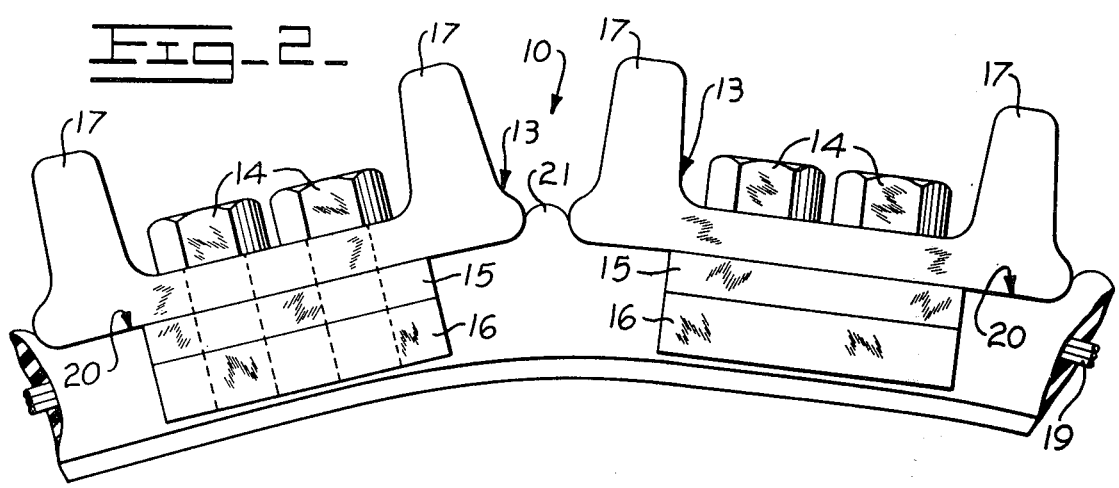
FIG. 2 is an enlarged elevation of two adjacent track shoes and a short portion of the belt illustrated in FIG. 1.
Figure 3:
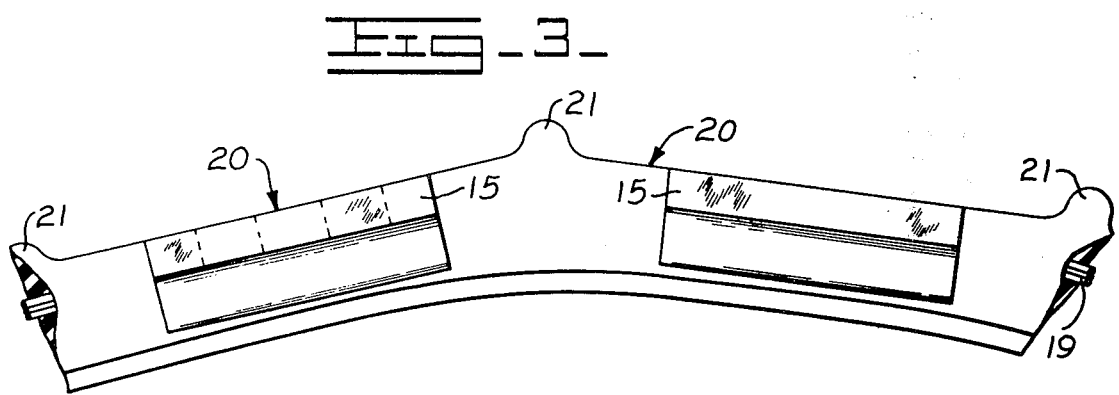
FIG. 3 is an elevation similar to FIG. 2 with the track shoes removed to show the permanently formed flat shoe sites separated by a raised sealing rib or ridge between the adjacent sites.

In order to form the flat shoe site 20, best shown in FIGS. 2 and 3, the above procedure of making the belts is modified when the outer layer of elastomer is applied over the cylindrical reinforcing plies by increasing its thickness and flat plates are bolted to the keeper bars 15 or anchors in the drum if the keeper bars are not integrally formed in the belt, prior to curing the elastomer. This procedure will cause the elastomer under these plates to flow forming flat sites on the outer surface of the belt directly beneath each flat plate. Further, a rib or ridge of elastomer is added to the gaps between adjacent plates and ultimately forms the integral transverse sealing rib between adjacent track shoes. Subsequent to the procedure the unit is wrapped with shrink tape and cured as a unit thereby permanently forming these flat shoe sites on the outer surface of the belt. Thereafter the shrink tape and flat plates are removed and the flat plates are replaced by track shoes 13. It is undesirable to flow the elastomer in the uncured belt extensively since it can disrupt the lay of the reinforcing plies, so it is preferable to add elastomer stock to form the transverse sealing ribs 21, rather than to extrude (flow) adequate elastomer from beneath the flat plates to form these raised ribs.

It must also be appreciated that the flat shoe sites on the surface of the elastomer might be formed in an automated mold having dies for permenently fashioning these flat sites and the ribs on the outer surface of the belt.

As can be appreciated from FIGS. 1, 2 and 3 the outer peripheral surface of the elastomer belt has a permanent polygonal configuration with the adjacent flat surfaces (shoe sites 20) separated by a transverse sealing rib 21. (See in particular FIG. 3).

With this arrangement the underside surface of each track shoe 13 nests with a permanently formed flat track shoe site 20 in a manner that its leading and trailing edges abut against the raised sealing ribs or ridges 21 on opposite sides of its flat shoe site. As a result of this arrangement the track belt is fully sealed against the ingress of soil and rock under and between the track shoes.

As can be seen in FIGS. 4 and 5, the integral version of this track belt includes circumferential lands 22 raised from the inner periphery of the track belt 10 which mate with grooves 23 in the surface of the carcass to stabilize the lateral position of the track belt thereon.

When the keeper bars are integrally formed with the elastomer belt the track belt is fully sealed after the track shoes are properly mounted on the belt. The individual track shoes have their leading and trailing edges rounded, as can be seen in the drawings, so these edges will not cut the elastomer rib between adjacent track shoes.

As this track belt rolls through the footprint the cured elastomer is displaced slightly beneath the leading and trailing edges of the track shoes as they articulate toward an aligned condition. Some of the displacement is absorbed in the pneumatic supporting carcass so that the elastomer is not extruded by this action.

In order to improve the coupling between the reinforcing ply in the belts and the individual track shoes and keepers, a small spacer may be employed to slightly increase the thickness of elastomer in the flat track shoe site so that when the track shoe is attached it can densify the elastomer when the belt is clamped between the shoe and its associated keeper bar, thereby improving the coupling with the reinforcing.

When the keeper bars are channel-shaped, as illustrated in the drawings, and the belt fits closely to the walls thereof the couple is improved further, as lateral extrusion of the elastomer is prevented when the clamping action takes place.

What is claimed is:

1. A method of making a sealed track belt comprising:
    arranging a band of uncured elastomer in a cylindrical configuration and supporting said band in said configuration;
    applying at least one ply of inextensible reinforcing substantially across the width of said band in said cylindrical configuration to form an inextensible cylindrical reinforcing ply;
    subsequently applying a layer of uncured elastomer over said cylindrical reinforcing ply, said layer having sufficient thickness to cover said reinforcing ply and to form corner filets between flat shoe sites subsequently formed on the surface of said layer;
    thereafter forcing a plurality of flat rectangular plates against the outer surface of said layer of uncured elastomer at equally spaced circumferential intervals with sufficient force to form a plurality of flat track shoe sites; and
    curing said band and layer of elastomers with said flat plates forced against said layer of uncured elastomer thereby forming a plurality of permanent flat track shoe sites in the outer periphery of said belt with an inner circular periphery.

2. The method of claim 1 wherein strips of uncured elastomer stock are placed between the adjacent edges of the flat plates after said plates have been forced into the layer of uncured elastomer to form a plurality of flat track shoe sites whereby a raised transverse rib of elastomer will be formed between each of the resulting permanent track shoe sites when the layer, band and strips of elastomer are subsequently cured.

3. The method defined in claim 1 wherein track shoes are subsequently attached to the plurality of permanent flat track shoe sites by clamping the resulting sealed track belt against the underside of each track shoe so attached.

4. The method defined in claim 1 wherein keeper members are incorporated in the band of uncured elastomer when it is arranged in a cylindrical configuration and supported in that configuration and the track shoe sites subsequently formed in the outer periphery of the uncured elastomer layer are in registry with said keeper members.

* * * * *

UNITED STATES PATENT OFFICE
CERTIFICATE OF CORRECTION

Patent No. 3,948,707   Dated April 6, 1976

Inventor(s)  Charles E. Grawey et al.

It is certified that error appears in the above-identified patent and that said Letters Patent are hereby corrected as shown below:

On the cover sheet under "United States Patent [19] and in item [75], "Grawley" should read -- Grawey --.

In item [62] and in column 1, line 3, after "Des. 231,700" the following should be inserted:

-- This U. S. patent issued from Serial No. 282,707 filed August 22, 1972, abandoned in favor of continuation-in-part application Serial No. 443,405 filed February 19, 1974, now U.S. Patent 3,899,220 issued August 12, 1975. --.

Signed and Sealed this

Ninth Day of November 1976

[SEAL]

Attest:

RUTH C. MASON
Attesting Officer

C. MARSHALL DANN
Commissioner of Patents and Trademarks